No. 618,545. Patented Jan. 31, 1899.
G. W. MEIGS.
SPECTACLES OR EYEGLASSES.
(Application filed Nov. 20, 1897.)
(No Model.)
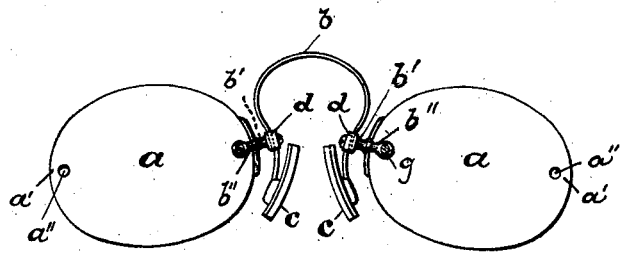
Fig. 1.
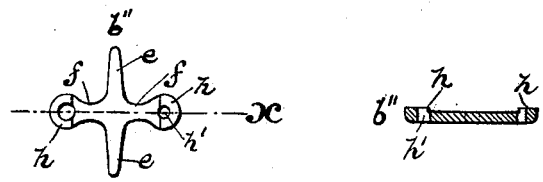 
Fig. 2. Fig. 3.
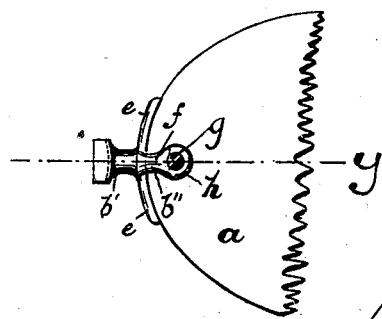 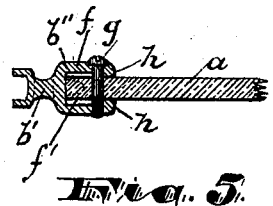
Fig. 4. Fig. 5.
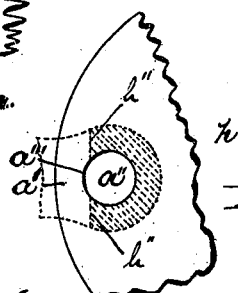
Fig. 6.
WITNESSES:
A. R. Krousse
C. B. Sibley
INVENTOR
George W. Meigs,
BY Drake & Co.
ATTORNEYS.

UNITED STATES PATENT OFFICE.

GEORGE W. MEIGS, OF NEWARK, NEW JERSEY, ASSIGNOR TO THE SPENCER OPTICAL MANUFACTURING COMPANY, OF SAME PLACE.

SPECTACLES OR EYEGLASSES.

SPECIFICATION forming part of Letters Patent No. 618,545, dated January 31, 1899.

Application filed November 20, 1897. Serial No. 659,229. (No model.)

*To all whom it may concern:*

Be it known that I, GEORGE W. MEIGS, a citizen of the United States, residing at Newark, in the county of Essex and State of New Jersey, have invented certain new and useful Improvements in Spectacles or Eyeglasses; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates more particularly to that class of eyeglasses and spectacles which are devoid of frames around the peripheries of the lenses and at the connection of the nosepiece, handle, catches, and other appendages to said lenses provided with clips by means of which the said appendages are securely fastened to said lenses.

The objects of the present improvements are to avoid more perfectly the frequent breakage of the lens occasioned by clamping the said clip to the lens, to relieve the said lens from undue strain at a point between the screw-perforation and end edge of said lens, by which strain heretofore the said lens was subject to easy breakage when in the completed eyeglass, to enable a greater range of lenses of varying thicknesses to be clamped between clips of a given size, and to secure other advantages and results, some of which may be referred to hereinafter in connection with the description of the working parts.

The invention consists in the improved eyeglasses, in the clip therefor, and in the arrangements and combinations of parts thereof, all substantially as will be hereinafter set forth, and finally embraced in the clauses of the claim.

Referring to the accompanying drawings, in which like letters of reference indicate corresponding parts in each of the views, Figure 1 is a front elevation of my improved eyeglass. Fig. 2 is a plan of the clip in blank. Fig. 3 is a section of the same on line $x$. Fig. 4 is an enlarged view of said clip as applied to the lens, and Fig. 5 is a section of the same on line $y$. Fig. 6 is an enlarged detail of a portion of one of the lenses.

In said drawings, $a\,a$ indicate the lenses. $b$ indicates a spring bowed to pass over the nose and connect said lenses. $c\,c$ are the nosepieces, and $d\,d$ the clips by which said spring is attached to the lenses to hold the same in relative position. Each of the said clips consists of the post $b'$ and the clip-body $b''$, which are united by solder or in any other suitable manner. Said clip-body consists of a piece of metal struck up from a sheet in a form like what is shown in Fig. 2, in which said body is provided with arms $e\,e$, extending oppositely from the center of said body, and when completed, as in Fig. 4, curved to conform to the curved end edge of the lens, so as to press or lie against said edge and provide proper bearings by which the said clip is held firmly to the lens or the lens to the clip and pivotal action is prevented. Said clip-body is also provided with arms $f\,f$, which extend oppositely from the line of the arms $e\,e$ and at their ends are enlarged, as at $h$, the enlargement being perforated, as at $h'$, Figs. 2 and 3, the inner walls of one of which perforations is suitably threaded to receive the clip-screw $g$. From the blank form shown in Fig. 2 said arms $f\,f$ are bent to lie parallel or approximately parallel with one another, as in Fig. 5.

It will be apparent that the weakest part of the lens is that portion (marked $a'$ in Fig. 1) which lies between the perforation $a''$ for the screw and the nearest part of the edge of the glass, and in the ordinary manufacture of eyeglasses a very considerable percentage of lenses have been broken and rendered worthless in the course of manufacture in the operation of applying the clip. This is due to the abnormal strain brought largely upon the weak portion $a'$ of the glass in the clamping operation and the torsional strain brought thereon, especially when the lenses are concavo-convex or irregularly curved. In my construction I relieve this weak portion $a'$, which heretofore received part of the clip strain and in some cases received an undue proportion of said strain, from such strain and bring all the face contact upon the glass at points toward the lens-center perforation $a''$ inward from the outer edge $a'''$ of the screw hole or perforation $a''$ upon the stronger part of the lens, as shown in Figs. 5 and 6. To this end I form upon the clip-body $b''$, on the inner side of the arms $f$, bosses or projections $h$, immediately at and partly around the perforations $h'$. The bosses or projections lie at the outer extremities of the arms $f$, the projections or bosses of each arm terminating at points outside of the inner edges of the perforation $h'$, so that said bosses will not extend entirely around said perforations $a''$ and come in contact with the weak part $a'$ of the glass. I thus bring all the strain upon the strong central parts of the lens, and in the clip-applying operations the lens will not break, but will firmly resist the clip strain, as will be understood.

By recessing the arms $f\,f$ and forming a clearance $f'$, Fig. 5, between the perforations $h'$ and the inner end of the slot or aperture formed between the arms $f$ I am enabled to insert between said arms a greater variety of differently-sized lenses, as will be apparent, and thus considerable time is saved in assembling the parts and obtaining proper fits. Furthermore, by having solid metal beneath the screw-head extending from the under side of the screw-head full to the glass immediately at the perforation, excepting at the inner part of the edge of the perforation $h'$, as described, a strong seat is provided the screw-head, which will not collapse or sink beneath the said head under pressure, as will be apparent.

It will be observed upon reference to Fig. 6 that the contact-boss does not extend entirely around the screw, but is a segment of a circle and provides at its ends stops, and therefore should said contact-boss be brought into engagement with a concave face of the lens and be clamped thereon by the screw it would be impossible for said boss to turn in the concavity, or perhaps, more properly, the lens cannot turn with relation to said boss; but, on the contrary, the end stops $h''$, should an attempt be made to turn the lens on the screw as a pivot, will engage at its edges the thicker faces of the convexity and be stopped from turning. I thus find in practice that when concave lenses are employed I can dispense with the curved edge arms $e\,e$ and yet maintain a rigid and firm connection, all of which conduces to cheapness a more simple and neat construction.

Having thus described the invention, what I claim as new is—

1. The improved clip for eyeglasses, &c., comprising a piece of metal having arms $f, f$, bent to lie on opposite sides of the lens, said arms being perforated near their extremities to receive the clamping-screw or like fastener, the said arms, on their inner sides, having bosses, lying at said perforations entirely forward from the inner side of said perforations, a clearance being provided extending from said screw-hole to the inner end of the slot or aperture between said arms, substantially as set forth.

2. The combination with the perforated lens, of a clip having perforated arms with segmental inward bosses adapted to contact with the lens, the stop edges of which bosses are adapted to prevent turning on the clamping-screw when engaging the curvature of a gradually-thickening surface of the lens, and said clamping-screw passing through said perforations and holding said parts together, substantially as set forth.

In testimony that I claim the foregoing I have hereunto set my hand this 6th day of November, 1897.

GEORGE W. MEIGS.

Witnesses:
CHARLES H. PELL,
C. B. PITNEY.